(12) United States Patent
Dent

(10) Patent No.: US 7,189,006 B2
(45) Date of Patent: Mar. 13, 2007

(54) OPTICAL CONNECTOR ASSEMBLIES

(75) Inventor: Peter Dent, Enfield (GB)

(73) Assignee: Smiths Group plc (GB)

( * ) Notice: Subject to any disclaimer, the term of this patent is extended or adjusted under 35 U.S.C. 154(b) by 0 days.

(21) Appl. No.: 11/221,843

(22) Filed: Sep. 9, 2005

(65) Prior Publication Data

US 2006/0056771 A1    Mar. 16, 2006

(30) Foreign Application Priority Data

Sep. 16, 2004    (GB) ................................ 0420547.2

(51) Int. Cl.
*G02B 6/38*    (2006.01)

(52) U.S. Cl. ........................... 385/66; 385/62; 385/72; 385/75

(58) Field of Classification Search .................. 385/62
See application file for complete search history.

(56) References Cited

U.S. PATENT DOCUMENTS

| 4,192,575 A | 3/1980 | Hodge |
| 4,799,759 A | 1/1989 | Balyasny |
| 5,898,807 A | 4/1999 | Welsh |
| 6,236,787 B1 | 5/2001 | Laughlin |
| 6,722,789 B1 * | 4/2004 | Hyzin et al. .................. 385/78 |

FOREIGN PATENT DOCUMENTS

| EP | 0674196 | 9/1995 |
| EP | 1205779 | 5/2002 |
| EP | 1324085 | 7/2003 |
| GB | 1458897 | 12/1976 |

OTHER PUBLICATIONS

International Search Report No. GB0516840.6, dated Nov. 2, 2005, 1 page.
International Search Report No. EP 05255068, dated Jan. 26, 2006, 2 pages.

* cited by examiner

*Primary Examiner*—Michelle Connelly-Cushwa
*Assistant Examiner*—Jerry T Rahll
(74) *Attorney, Agent, or Firm*—Connolly Bove Lodge & Hutz LLP; Brian J. Hairston

(57) ABSTRACT

An optical connector assembly has several optical and electrical connectors mounted in mateable rectangular housings. Each optical connector is resiliently mounted in an alignment sleeve by means of a spring clip encircling the connector and contacting the sleeve. The alignment sleeves are themselves resiliently mounted in passages through the housings by spring clips encircling the sleeves and contacting passages within which the sleeves are mounted.

8 Claims, 3 Drawing Sheets

OPTICAL CONNECTOR ASSEMBLIES

BACKGROUND OF THE INVENTION

This invention relates to optical connector assemblies and components.

Optical connectors, such as fibre-optic connectors, can be more prone to damage than electrical connectors, especially when the connector termination encloses the end of the fibre within a ceramic ferrule. It is possible to provide robust optical connectors but these are usually specially designed and manufactured so are expensive compared with standard fibre-optic connector components. Examples of optical connectors are described in U.S. Pat. No. 6,382,844 and EP1193516.

BRIEF SUMMARY OF THE INVENTION

It is an object of the present invention to provide an alternative optical connector assembly.

According to one aspect of the present invention there is provided an optical connector assembly including first and second connector housings mateable with one another to establish optical interconnection between first and second optical connectors, the first housing having a first passage extending therethrough in which the first connector is located, the second housing having a second passage extending therethrough in which the second connector is located, the first housing including a first alignment sleeve located in the first passage and having a cavity therein within which the first connector is retained, the second housing including a second alignment sleeve located in the second passage and having a cavity therein within which the second connector is retained, one end of the second alignment sleeve being adapted for insertion in one end of the first alignment sleeve when the first and second housings are mated with one another such that the first and second optical connectors are optically interconnected with one another within the alignment sleeves, and each housing including first resilient means arranged to mount the first and second connectors resiliently with respect to the respective alignment sleeves and second resilient means arranged to mount the alignment sleeves resiliently with respect to respective ones of the housings.

The resilient means may be spring clips. The resilient means may each have a cylindrical sleeve and a plurality of spring tines projecting from the sleeve. The resilient means may be of a metal. Each second resilient means is preferably retained in a recess in a respective housing between two parts of the housing. The first and second housings are preferably of rectangular shape. Each housing preferably includes a plurality of optical connectors arranged to mate with respective optical connectors on the other housing. Each housing may include at least one electrical connector arranged to mate with an electrical connector on the other housing. The first and second optical connectors preferably have spring-loaded portions arranged to engage one another.

According to another aspect of the present invention there is provided an alignment sleeve for a housing of an assembly according to the above one aspect of the present invention.

A combined electrical and optical connector assembly according to the present invention will now be described, by way of example, with reference to the accompanying drawings.

DETAILED DESCRIPTION OF THE PREFERRED EMBODIMENT

The connector assembly comprises two parts, a plug assembly 1 and a receptacle assembly 2, which are mateable with one another. Each assembly 1 and 2 is of rectangular shape and includes a number of electrical contacts 10 and 20 and four optical connector contacts 11 and 21, which interconnect electrically and optically when the assemblies are mated together.

Figure 1:
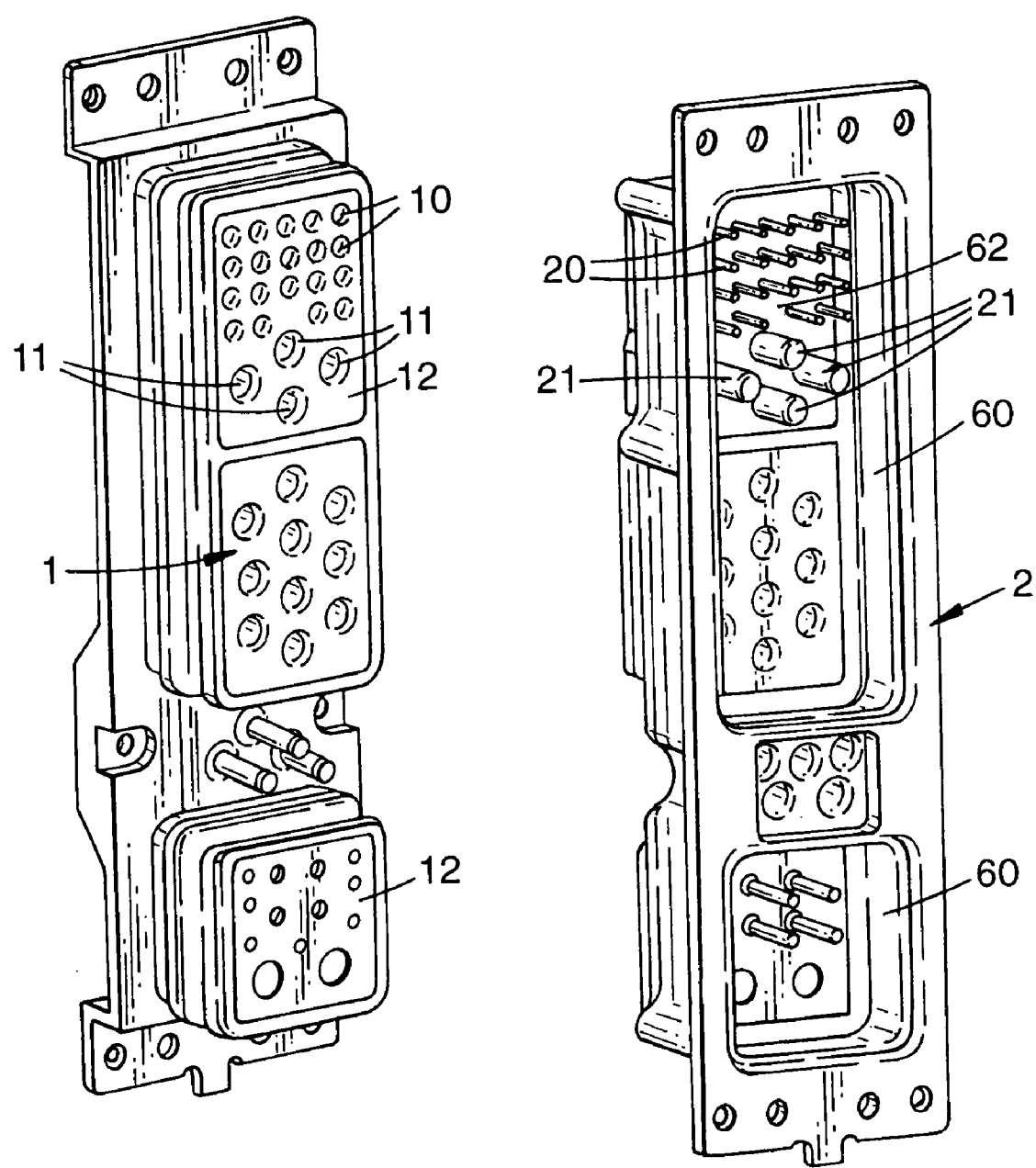
FIG. 1 is a perspective view showing the two mating parts of the assembly.
Figure 2:
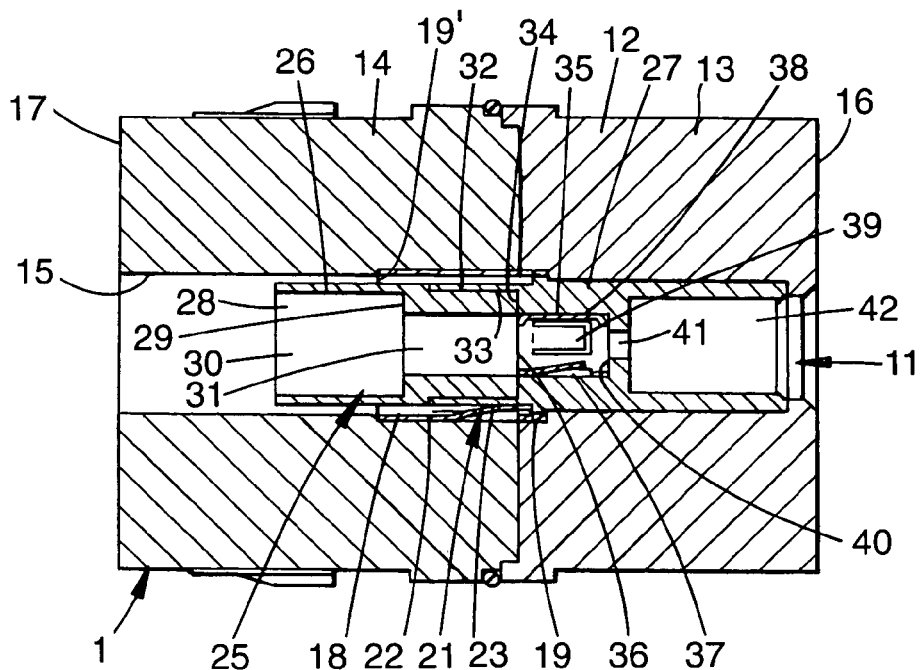
FIG. 2 is a sectional view through one part of the assembly without the optical termination being present.
Figure 3:
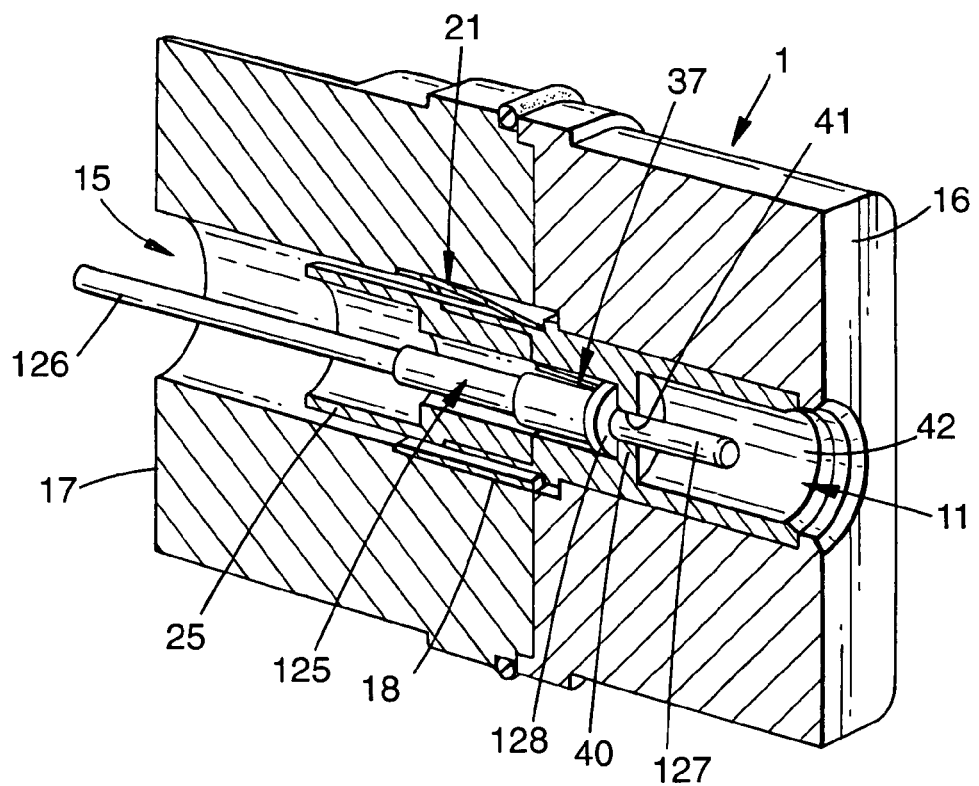
FIG. 3 is a cut-away perspective view of the part shown in FIG. 2 with the optical termination present.

With reference in particular to FIGS. 2 and 3, the plug assembly 1 includes an electrically-insulative, forwardly-projecting rectangular block housings 12 divided into a front and rear part 13 and 14 and having optical mounting passages 15 of circular section extending through the housing between the front and rear faces 16 and 17. The mounting passages 15 are of a standard ARINC Size 8, with a mid-section recess 18 slightly enlarged in diameter to provide a shallow rear-facing shoulder 19 and a forward-facing shoulder 20. A resilient metal spring clip 21 is retained in the mid-section 18 of each passage 15 engaging the shoulders 19 and 19' at opposite ends. The clips 21 are of tubular shape having an outer cylindrical sleeve 22 and several spring tines 23 attached at their rear ends with the sleeve and having their forward ends inclined inwardly. Each clip 21 serves to retain a respective alignment sleeve 25 within a passage 15.

The alignment sleeve 25 is formed of a rear part 26 and a forward part 27 joined with one another. The two parts 26 and 27 are tubular in shape and are machined from a metal such as stainless steel. The rear part 26 has a cavity or bore 28 of circular section extending through it and divided by a shoulder 29 into a rear portion 30 of relatively large diameter and a narrower forward portion 31. Externally, the rear part 26 is stepped towards its forward end to form a slightly reduced diameter nose 32. The nose 32 of the rear part 26 is received within the rear end 33 of the forward part 27, abutting an internal shoulder 34. The shoulder 34 surrounds the rear end of a central, cylindrical cavity 35 in the forward part, which is of an ARINC Size 16. The nose 32 of the rear part 26 has a slightly smaller internal diameter than the cavity 35 thereby forming a shallow annular lip 36 projecting inwardly around the rear of the cavity. The nose 32 is retained in the rear end 33 of the forward part 27 by any conventional means, such as by a press fit.

The cavity 35 houses an inner, spring retaining clip 37 similar to the outer retaining clip 21 and of ARINC size 16. The clip 37 is of tubular shape having an outer cylindrical sleeve 38 and several spring tines 39 attached at their rear ends with the sleeve and having their forward ends inclined inwardly. The rear end of the clip sleeve 38 is retained by contact with the lip 36. The forward end of the clip sleeve 38 is retained by contact with a flange 40 projecting inwardly about midway along the forward part 27. The flange 40 has a central, circular aperture 41 opening into an enlarged forward recess 42, which in turn opens at the forward end of the alignment sleeve 25 close to the forward end of the passage 15.

The alignment sleeve 25 receives a conventional ceramic tube fibre-optic connector termination 125 (FIG. 3), such as of the kind sold by Glenair under the code MIL-T-29504/5 (size 16 fibre-optic socket contact, Part No 181-001), attached at the forward end of a fibre-optic cable 126. The termination 125 has a spring-loaded ferrule 127 protecting the end of the cable 126 and extending through the aperture 41 in the flange 40. A collar 128 projecting radially outwardly of the ferrule 127 locates between the rear side of the flange 40 and the forward end of the tines 39 on the clip 37 so as to retain the termination securely within the alignment sleeve 25 and hence in the plug assembly 1. A resilient grommet or boot (not shown) is fitted between the rear end of the sleeve 25 and the cable 126 to provide sealing and strain relief whilst allowing for movement of the cable.

Figure 4:
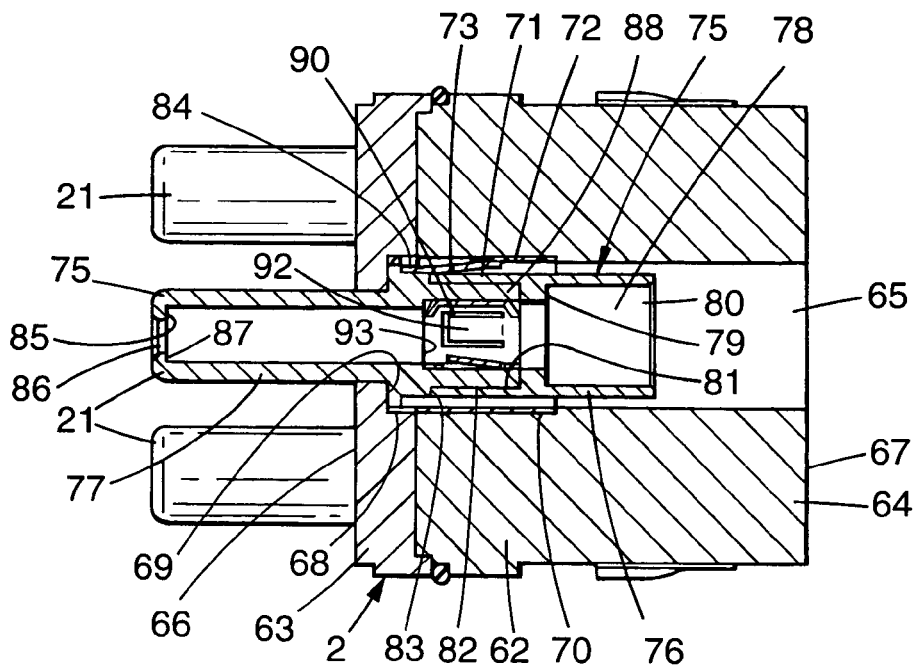
FIG. 4 is a sectional view through the other part of the assembly without the optical termination being present.
Figure 5:
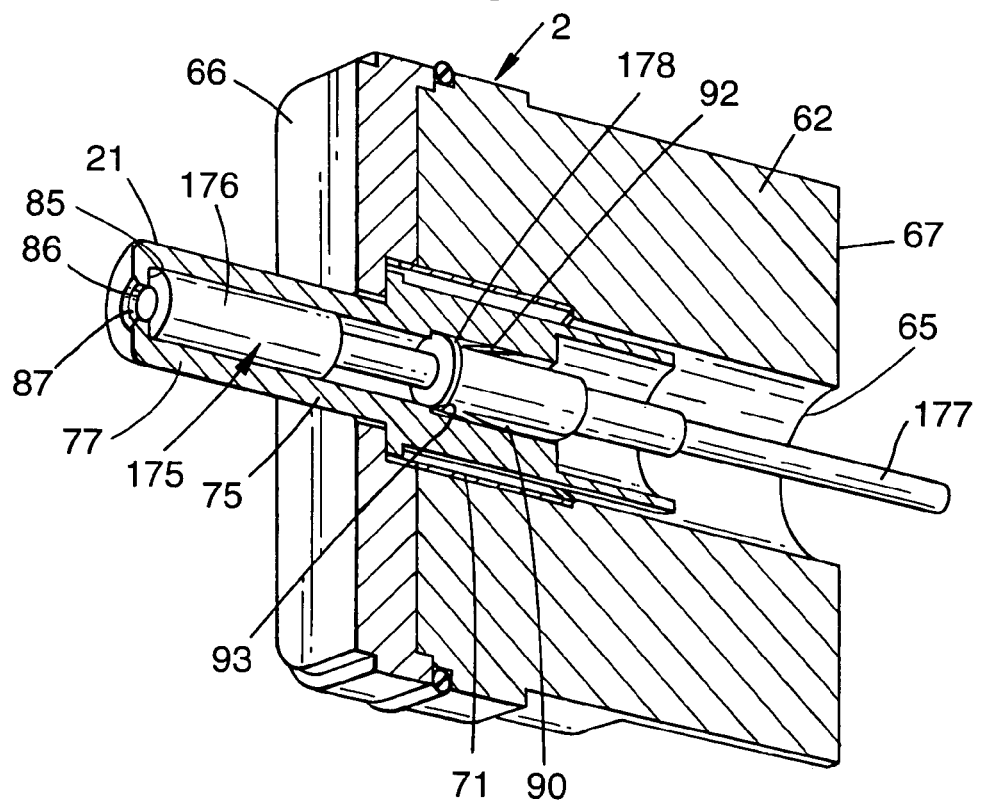
FIG. 5 is a cut-away perspective view of the part shown in FIG. 4 with the optical termination present.

With reference now also to FIGS. 4 and 5, the socket assembly 2 has recesses 60 on its forward surface 61 within which the projecting block housings 12 on the plug assembly 1 are insertable. The recesses 60 contain the various electrical contact elements 20 adapted electrically to engage the contact elements 10 on the plug assembly 1 and the four optical connector contacts 21, which optically interconnect with the optical connector contacts 11 on the plug assembly. The socket assembly 2 includes an electrically-insulative housing 62 in which the electrical contact elements 20 and optical contact elements 21 are supported. The housing 62 is divided into a front and rear part 63 and 64 and has optical mounting passages 65 of circular section extending through the housing between the front and rear faces 66 and 67. Each mounting passage 65 is of a standard ARINC Size 8, with a slightly enlarged diameter section 68 towards its forward end providing a rear-facing shoulder 69 and a forward-facing shoulder 70. An outer resilient metal spring clip 71 is retained in the mid-section recess 68 of each passage 65 engaging the shoulders 69 and 70 at opposite ends. The clip 71 is of the same kind as the outer clip 21 in the plug assembly 1, having a tubular shape with an outer cylindrical sleeve 72 and several spring tines 73 attached at their rear ends with the sleeve and having their forward ends inclined inwardly. The clips 71 serve to retain a respective alignment sleeves 75 within the passages 65.

The alignment sleeves 75 are formed of a rear part 76 and a forward part 77 joined with one another. The two parts 76 and 77 are tubular in shape and are machined from a metal such as brass. The rear part 76 has a cavity or bore 78 of circular section extending through it and divided by a shoulder 79 into a rear portion 80 a forward portion 81. The forward portion 81 of the bore 78 receives the rear end 82 of the forward part 77 of the sleeve 75, with the forward end of the rear part 76 abutting the rear side of an external lip 83 on the forward part. The forward side of the lip 83 abuts the rearwardly-facing shoulder 69 in the passage 65 and the lip is stepped to form a rearwardly-facing forward edge 84, which is engaged by the forward end of the tines 73 to retain the sleeve 75 in position within the passage 65. The forward part 77 of the sleeve 75 has a length approximately equal to that of the rear part and it projects forwardly out of the passage 65 beyond the forward face 66 of the housing 62. Externally and internally the projecting portion 77 of the sleeve 75 has a constant diameter and is formed with an in-turned rim 85 at its forward end producing a reduced diameter aperture 86 and a rearwardly-facing internal shoulder 87.

An inner, spring retaining clip 90 similar to the outer retaining clip 71 and of ARINC size 16 is retained in a cavity 88 at the rear end of the forward part 77 of the sleeve. The clip 90 is of tubular shape having an outer cylindrical sleeve 91 and several spring tines 92 attached at their rear ends with the sleeve and having their forward ends inclined inwardly. The rear end of the clip sleeve 90 is retained by contact with the shoulder 79, which has an internal diameter slightly smaller than that of the rear end of the forward part 77 of the sleeve so that there is a shallow projecting edge against which the clip sleeve 90 engages. The forward end of the clip sleeve 90 is retained by contact with an annular step 93 projecting inwardly of the forward part substantially level with the forward end of the rear part 76.

The alignment sleeve 75 receives a conventional ceramic tube fibre-optic termination 175 (FIG. 5) of the kind sold by Glenair under code No MIL-T-29504/4 (size 16 fibre-optic pin contact, Part No 181-002). This is adapted to make optical interconnection with the optical termination 125 in the plug assembly 1. The termination 175 extends to the forward end of the sleeve 75 and has a spring-loaded ferrule 176 protecting the end of the cable 177. The termination 175 has a collar 178 projecting outwardly about midway along its length, which is engaged between the step 93 and the forward end of the tines 92 so as to retain the termination securely in the sleeve 75. A resilient grommet or boot (not shown) is fitted between the rear end of the sleeve 75 and the cable 177 to provide sealing and strain relief whilst allowing for movement of the cable.

The spring clip mounting of the alignment sleeves in the plug and socket housings provides a degree of resilience to the mounting, thereby enabling some angular movement of the sleeves relative to the housings. This enables the sleeves to align with one another without damage.

The spring clips 21, 37, 71 and 90 can be released to remove the terminations and the alignment sleeves by means of a conventional extraction tool.

When the plug assembly 1 is inserted into the socket assembly 2, the projecting portion 77 of the sleeves 75 enter the forward recess 42 of the mating sleeves 25 until the forward end 85 of the sleeves 75 engage the flange 40 in the sleeves 25. As this happens, the ferrule 127 on the termination 25 enters the bore of the ferrule 176 on the termination 175 until the ends of the respective fibre-optic cables contact one another. The spring loading of the two ferrules 127 and 176 accommodates differences in axial positioning and prevents undue force being applied to the cable ends. In this position, the respective fibre-optic terminations and hence the cables 126 and 177 are optically interconnected.

The present invention enables rectangular connectors to be provided with conventional, low-cost optical terminations but with a substantially reduced risk of damage caused by repeated mating and unmating.

What I claim is:

1. An optical connector assembly comprising:
    first and second connector housings arranged to be mateable with one another, said first connector housing having a first passage extending therethrough in which a first optical connector is located, said second connector housing having a second passage extending therethrough in which a second optical connector is located;
    a first alignment sleeve located in said first passage and having a cavity therein within which said first optical connector is retained;
    a second alignment sleeve located in said second passage and having a cavity therein within which said second optical connector is retained, one end of said second alignment sleeve being adapted for insertion in one end of said first alignment sleeve such that said first and second optical connectors can be optically interconnected with one another within said first and second alignment sleeves;

first spring clips extending around respective ones of said first and second optical connectors within respective ones of said first and second alignment sleeves; and second spring clips extending around respective ones of said first and second alignment sleeves within respective passages in said first and second connector housings.

2. An assembly according to claim 1, wherein said first and second optical connectors have spring-loaded portions arranged to engage one another.

3. An assembly according to claim 1, wherein said first and second spring clips each have a cylindrical sleeve and a plurality of spring tines projecting from the sleeve.

4. An assembly according to claim 1, wherein said first and second spring clips are constructed of a metal.

5. An assembly according to claim 1, wherein each of said second spring clips is retained in a recess in a respective one of said first and second connector housings between two parts of said respective one of said first and second connector housings.

6. An assembly according to claim 1, wherein said first and second connector housings are of rectangular shape.

7. An assembly according to claim 1, wherein each of said first and second connector housings includes a plurality of optical connectors arranged to mate with respective optical connectors on the other said housing.

8. An assembly according to claim 1, wherein each of said first and second connector housings includes at least one electrical connector arranged to mate with an electrical connector on the other one of said first and second connector housings.

* * * * *